US010858051B2

(12) United States Patent
Redinger et al.

(10) Patent No.: US 10,858,051 B2
(45) Date of Patent: Dec. 8, 2020

(54) STANDING PLATFORM AND SUSPENSION ASSEMBLY FOR RIDING EQUIPMENT

(71) Applicant: MTD PRODUCTS INC, Valley City, OH (US)

(72) Inventors: Matthew Redinger, Valley City, OH (US); William Kromer, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 16/459,843

(22) Filed: Jul. 2, 2019

(65) Prior Publication Data

US 2020/0062321 A1 Feb. 27, 2020

Related U.S. Application Data

(60) Provisional application No. 62/693,845, filed on Jul. 3, 2018.

(51) Int. Cl.
*B62D 51/02* (2006.01)
*B60R 3/02* (2006.01)
(Continued)

(52) U.S. Cl.
CPC .............. *B62D 51/02* (2013.01); *A01D 34/67* (2013.01); *A01D 75/00* (2013.01); *B60R 3/02* (2013.01); *A01D 2101/00* (2013.01)

(58) Field of Classification Search
CPC .......... B62D 51/02; B62D 51/00; B60R 3/02; B60R 3/00; A01D 34/67; A01D 75/00; A01D 2101/00
(Continued)

(56) References Cited

U.S. PATENT DOCUMENTS 5,579,859 A   12/1996   Quellhorst
5,697,623 A   12/1997   Bermes
(Continued)

FOREIGN PATENT DOCUMENTS

CN   105083398   1/2018
DE   102006009331   9/2007
(Continued)

OTHER PUBLICATIONS

International Search Report and Written Opinion for International Patent Application No. PCT/US2019/040272 dated Dec. 2, 2019, 16 pages long.
(Continued)

*Primary Examiner* — John D Walters
(74) *Attorney, Agent, or Firm* — Wegman Hessler

(57) ABSTRACT

A standing operator support system for riding equipment, such as a standing mower, includes a suspendable standing platform for supporting the load of a standing operator and a suspension assembly adjustably engageable with the standing platform to suspend the standing platform relative to a fixable platform pivot axis of the standing platform. The suspension assembly is configured to allow for a uniform suspension experience for varied operators of varied weights while maintaining the standing platform in a relatively uniform and substantially horizontal orientation relative to terrain being traversed for the varied operators of varied weights. The suspension assembly is adjustable relative to the standing platform via a single motion to adjust between operator weight settings. The suspension assembly also may be adjustable relative to the standing platform for traverse over discrete raised portions of a terrain, such as a low rock wall or a curb.

19 Claims, 12 Drawing Sheets

(51) Int. Cl.
*A01D 34/67* (2006.01)
*A01D 75/00* (2006.01)
*A01D 101/00* (2006.01)

(58) Field of Classification Search
USPC .................................. 280/32.5, 32.7, 166
See application file for complete search history.

(56) References Cited

U.S. PATENT DOCUMENTS

| | | | |
|---|---|---|---|
| 5,809,756 | A | 9/1998 | Scag |
| 6,405,515 | B1 | 6/2002 | Wright |
| 6,490,849 | B1 | 12/2002 | Scag |
| 6,499,282 | B1 | 12/2002 | Velke |
| 6,510,678 | B2 | 1/2003 | Ferris |
| 6,782,964 | B1 | 8/2004 | Korthals |
| 6,879,261 | B2 | 4/2005 | Nishino |
| 7,213,662 | B2 * | 5/2007 | Crumly .............. A01D 34/6806 180/19.1 |
| 7,458,588 | B2 | 12/2008 | Kallevig |
| 7,712,751 | B2 | 5/2010 | Beal |
| 7,882,914 | B2 | 2/2011 | Scheele |
| 8,141,886 | B1 | 3/2012 | Sugden et al. |
| 8,186,475 | B2 | 5/2012 | Sugden |
| 8,262,104 | B2 | 9/2012 | Kallevig |
| 8,561,382 | B2 * | 10/2013 | Gamble ................ A01D 34/64 56/14.7 |
| 8,991,904 | B2 | 3/2015 | Yahner |
| 9,021,776 | B2 * | 5/2015 | Zwieg .................... A01D 34/74 56/17.1 |
| 9,066,468 | B2 | 6/2015 | Zwieg |
| 9,409,589 | B2 | 8/2016 | Oswald |
| 9,499,204 | B1 | 11/2016 | Gust |
| 9,731,760 | B2 | 8/2017 | Ito |
| 9,821,689 | B2 | 11/2017 | Busboom |
| 9,889,894 | B2 | 2/2018 | Lohmann |
| 2008/0196374 | A1 | 8/2008 | Gamble et al. |
| 2010/0102609 | A1 | 4/2010 | Confer |
| 2013/0074464 | A1 | 3/2013 | Gindt et al. |
| 2016/0152262 | A1 | 6/2016 | Laurin et al. |
| 2017/0341685 | A1 | 11/2017 | Andre |
| 2018/0065663 | A1 | 3/2018 | Reeves |
| 2019/0133039 | A1 * | 5/2019 | Bryant .................. A01D 69/03 |

FOREIGN PATENT DOCUMENTS

| | | |
|---|---|---|
| DE | 202015107017 | 2/2016 |
| EP | 0466065 | 5/1995 |
| EP | 1590228 | 4/2010 |
| EP | 2301827 | 3/2011 |
| EP | 2336008 | 7/2012 |
| EP | 2193703 | 11/2016 |
| EP | 3115283 | 11/2017 |
| WO | 2007084524 | 12/2007 |
| WO | 2017/214467 | 12/2017 |

OTHER PUBLICATIONS

"SRS™ Z1 Stand-On Mower," Ferris Commercial Mowers, ferrismowers.eu, Jun. 1, 2018. https://web.archive.org/web/20180601151320/https://www.ferrismowers.eu/standon-mowers/srs-z1/.

"GrandStand™ Stand-on Mower (74504TE)," Toro®, toro.com, accessed: Jun. 2018. https://www.toro.com/en-gb/professional-contractor/commercial-mowers.

"Vantage Stand-On Lawn Mowers," eXMark, exmark.com, Sep. 16, 2016. https://web.archive.org/web/20160916212755/http://www.exmark.com:80/products/mowers/stand-on/vantage.

"QuikTrak™ Stand-On Mowers," John Deere, deere.com, Oct. 23, 2017. https://web.archive.org/web/20171023231943/https://www.deere.com/en/mowers/commercial-mowers/quiktrak-mowers/.

"Stand-On Mowers Husqvarna V554," Husqvarna®, husqvarna.com, Jun. 1, 2018. https://web.archive.org/web/20180601153912/https://www.husqvarna.com/us/products/stand-on-mowers/v554/967672601/.

"Stander® X," Wright, wrightmfg.com, Jun. 1, 2018. https://web.archive.org/web/20180601154706/https://www.wrightmfg.com/products/mowers/commercial/stand-on/stander-x/.

* cited by examiner

STANDING PLATFORM AND SUSPENSION ASSEMBLY FOR RIDING EQUIPMENT

FIELD OF INVENTION

The present invention relates generally to riding equipment and more particularly to a standing platform and suspension assembly for outdoor riding equipment, such as equipment including a mower deck for cutting vegetation, such as a standing mower.

BACKGROUND

Riding equipment, whether for indoor use, outdoor use, or a combination of indoor and outdoor use, sometimes includes a standing platform system having a standing platform for supporting an operator or rider. The standing platform is typically located at a rear of the equipment adjacent a plurality of controls that allow the operator or rider to control motion of the equipment in addition to actuation of various other functionalities of the equipment, such as a mower deck, lift, etc. For outdoor riding equipment, the standing platform should be suitable for extended use over an undulating terrain.

In the case of outdoor riding equipment, such as for the purpose of mowing, conventional standing platform systems often are uncomfortable for periods of extended use over a bumpy terrain. These standing platform systems may lack one or more of adequate suspension, adjustability for varied weight operators, and ability to allow for traverse over discrete raised terrain portions.

SUMMARY OF INVENTION

Disclosed is an operator standing support system that includes a standing platform and an associated suspension assembly for supporting the standing platform during use. The standing platform and suspension assembly alleviate one or more of the aforementioned drawbacks of conventional standing platform systems. The suspension assembly allows for a uniform suspension experience for varied operators of varied weights while maintaining the standing platform in a relatively uniform and substantially horizontal suspended orientation relative to terrain being traversed for the varied operators of varied weights. The suspension assembly is adjustable relative to the standing platform via a single motion to adjust between operator weight settings. The suspension assembly also may be adjustable relative to the standing platform for traverse over discrete raised portions of a terrain, such as a low rock wall or a curb.

The suspension assembly includes a counter biasing member acting in tension, disposed relatively horizontal relative to the terrain being traversed, and having a fixed biasing constant. A position adjustment system is adjustable via a single linear sliding motion to adjust a moment arm distance between a contact location of the suspension assembly with the standing platform and a pivot axis of the suspension assembly. These features enable the standing platform to obtain a relatively similar level of suspension at each of the adjustment locations for the varied operator weights loaded at different engagement settings relative to the load of an appropriately weighted operator. The suspension assembly and standing platform further are configured to allow for active counter biasing of the standing platform by the counter biasing member at the adjustment location of each varied weight setting.

Also disclosed is riding equipment including at least a frame, a steering assembly operably coupled to the frame and to respective one or more drive wheels of the riding equipment, and an operator standing platform disposed adjacent controls for the steering assembly. The operator standing platform is pivotably coupled to the frame and supported relative to the frame by a suspension assembly. The suspension assembly is adjustable to different loading positions at the standing platform for use with varied operators of respective varied weights.

The foregoing and other features of the invention are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

The principles of the present disclosure have general application to standing riding equipment, whether indoor or outdoor riding equipment, and more particular application to outdoor riding equipment such as a standing mower. Thus, while the present disclosure is majoratively direct to a standing mower, the standing operator system disclosed also has utility for inclusion with non-mowing or non-outdoor riding equipment.

A standing operator support system of the present disclosure includes an operator standing platform, also herein referred to as a standing platform or a platform, and a suspension assembly for suspending and support the standing platform for use with operators of varied weights. Generally, the suspension assembly is position-adjustable relative to the standing platform to provide for the varied weights of operators, both light and heavy. At each engagement position of the suspension assembly with the standing platform the standing operator support system is configured to maintain the standing platform suspended substantially horizontal to the ground.

For example, numerous engagement positions may be obtainable, such as for a light operator and for a heavy operator. At each of these engagement positions, the operator standing system is configured to counter-balance the respective operator to provide a generally uniform suspension experience. This uniform experience is such that over-suspension of light operators can be restricted or altogether prevented such that any bump in the terrain causes jostling of the operator. The uniform experience is also such that under-suspension of heavy operators can be restricted or altogether prevented such as where the operator is not suspended at all and is jostled by each non-flat portion of terrain being traversed.

The adjustable suspension system includes a counter-balancing biasing element that acts in tension and is spaced to enable adequate extension. This disposition allows for suspension of both light and heavy operators without the need merely to bottom-out or hard-stop the pivoting of the standing platform, such as conventionally at the heaviest engagement position of conventional standing platform systems. Thus, even at the heavy setting engagement position, the loaded standing platform is actively suspended by the counter-balancing element.

The counter-balancing is applied to the standing platform via a pivot sub-assembly that counter balances the biasing force of the counter balancing element against the load of the operator and standing platform about a fixed suspension pivot axis of the suspension assembly. The moment arm between the engagement location of the suspension assembly with the standing platform and the fixed suspension pivot axis is adjustable to account for varied operator weights, with the moment arm being increased outwardly from the fixed suspension pivot axis for heavy operators.

Figure 1:
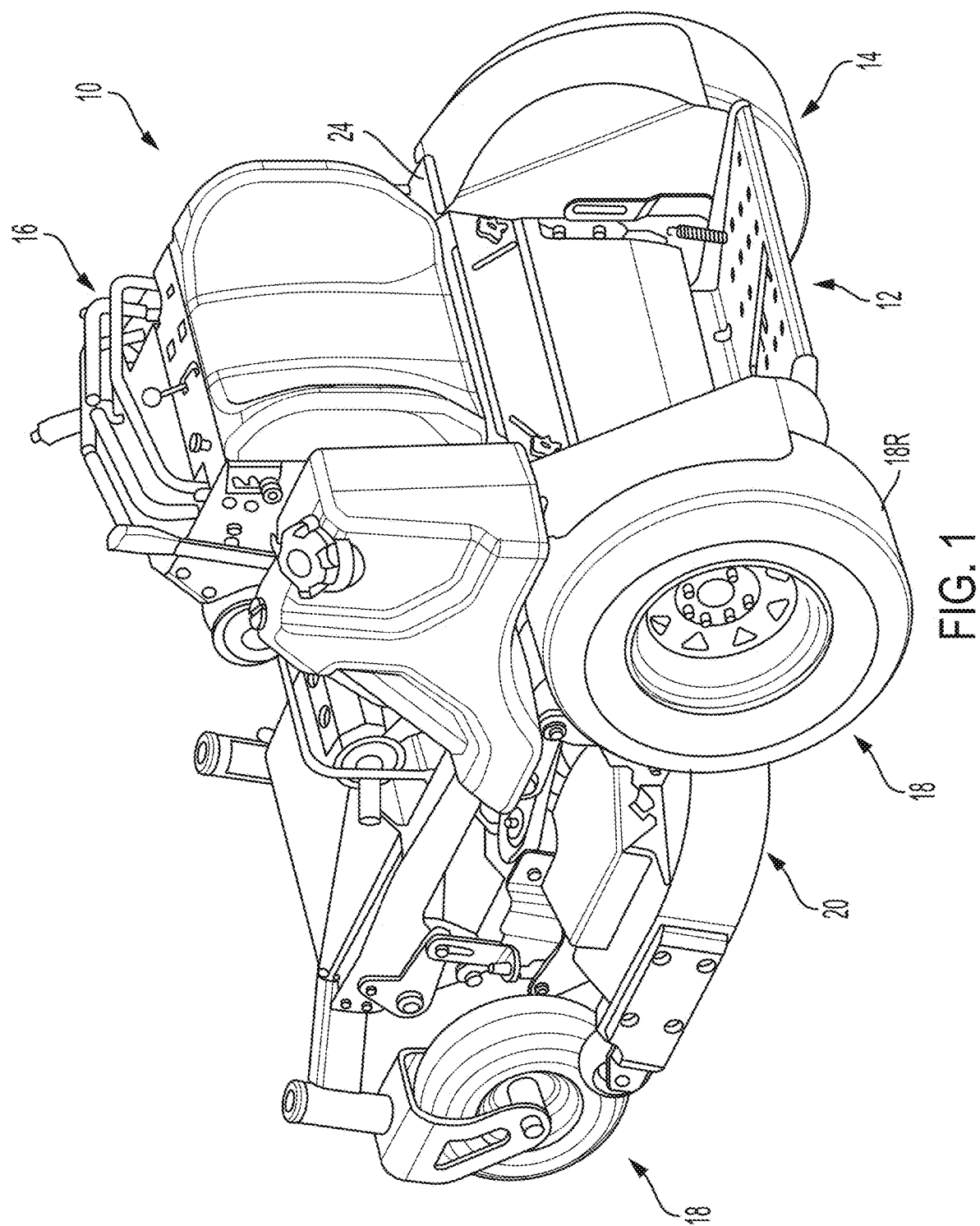
FIG. 1 is an environmental view of a standing mower including a standing platform and associated suspension assembly according to the present disclosure.

Turning now to FIG. 1, a standing mower 10 is illustrated including a standing operator support system 12. The standing operator support system 12 is disposed at a rear 14 of the standing mower 10 adjacent operator controls 16 provided at least controlling movement of the standing mower 10. The operator controls 16 are operably coupled to at least one drive wheel 18, such as a rear wheel 18R of at least two sets of wheels 18. The operator controls 16 also may be operably coupled to a mower deck 20, such as for cutting vegetation. Each of the wheels 18, mower deck 20 and standing operator support system 12 is coupled to and supported by a frame 24 of the standing mower 10.

Figure 2:
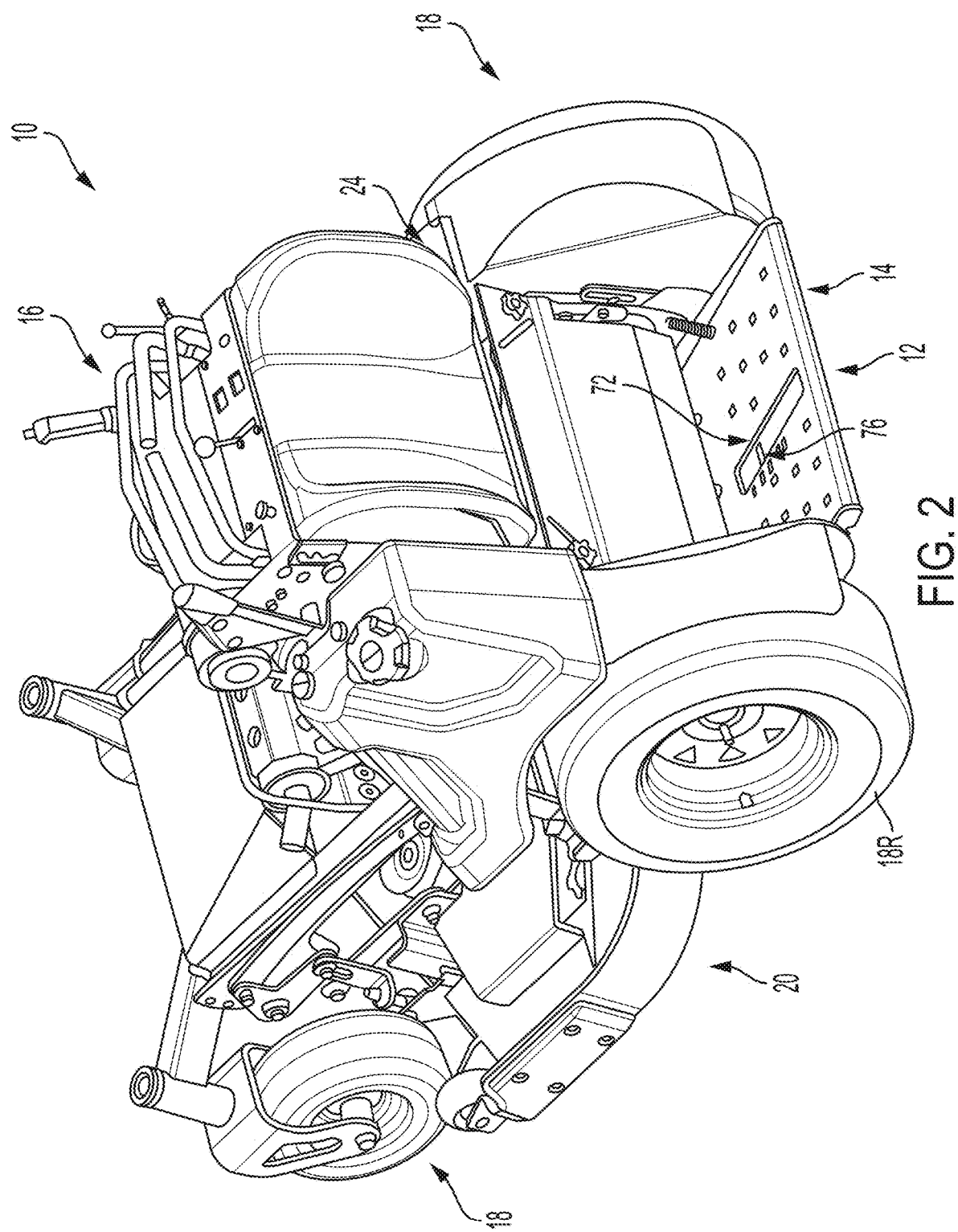
FIG. 2 is another environmental view of the standing mower of FIG. 1

As shown at least partially in FIG. 2, the standing operator support system 12 includes a support platform 30 pivotably coupled to the frame 24 and a suspension assembly 32 configured to suspend and support the support platform 30. The suspension assembly 32 also is pivotably fixable to the frame 24, such as at one or more locations spaced apart from a fixed pivot location of the support platform 30. The suspension assembly 32 is adjustable to different loading positions at the standing platform 30 for use with varied operators of respective varied weights.

Figure 3:
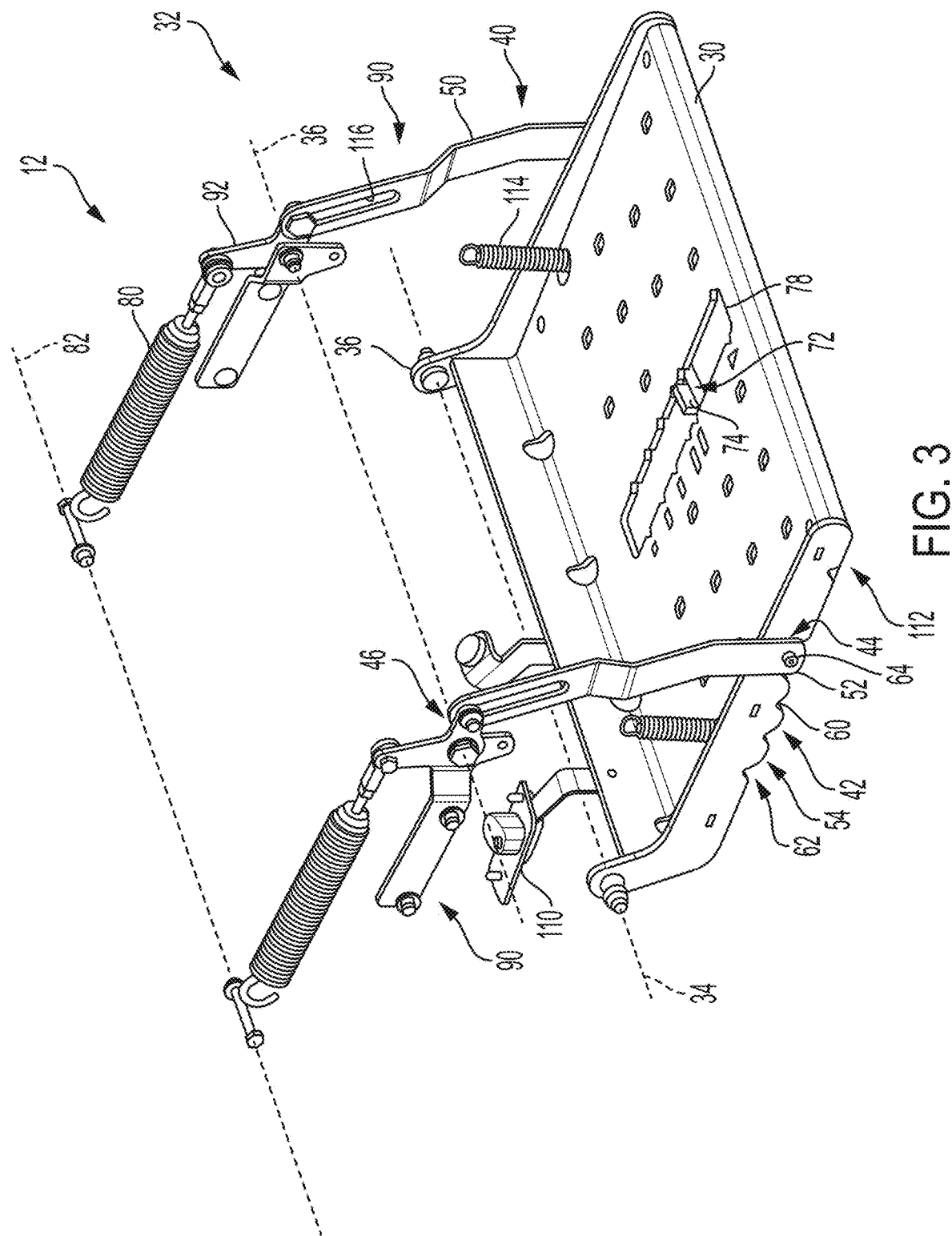
FIG. 3 is a perspective view of the standing platform and suspension assembly shown in FIG. 1.
Figure 4:
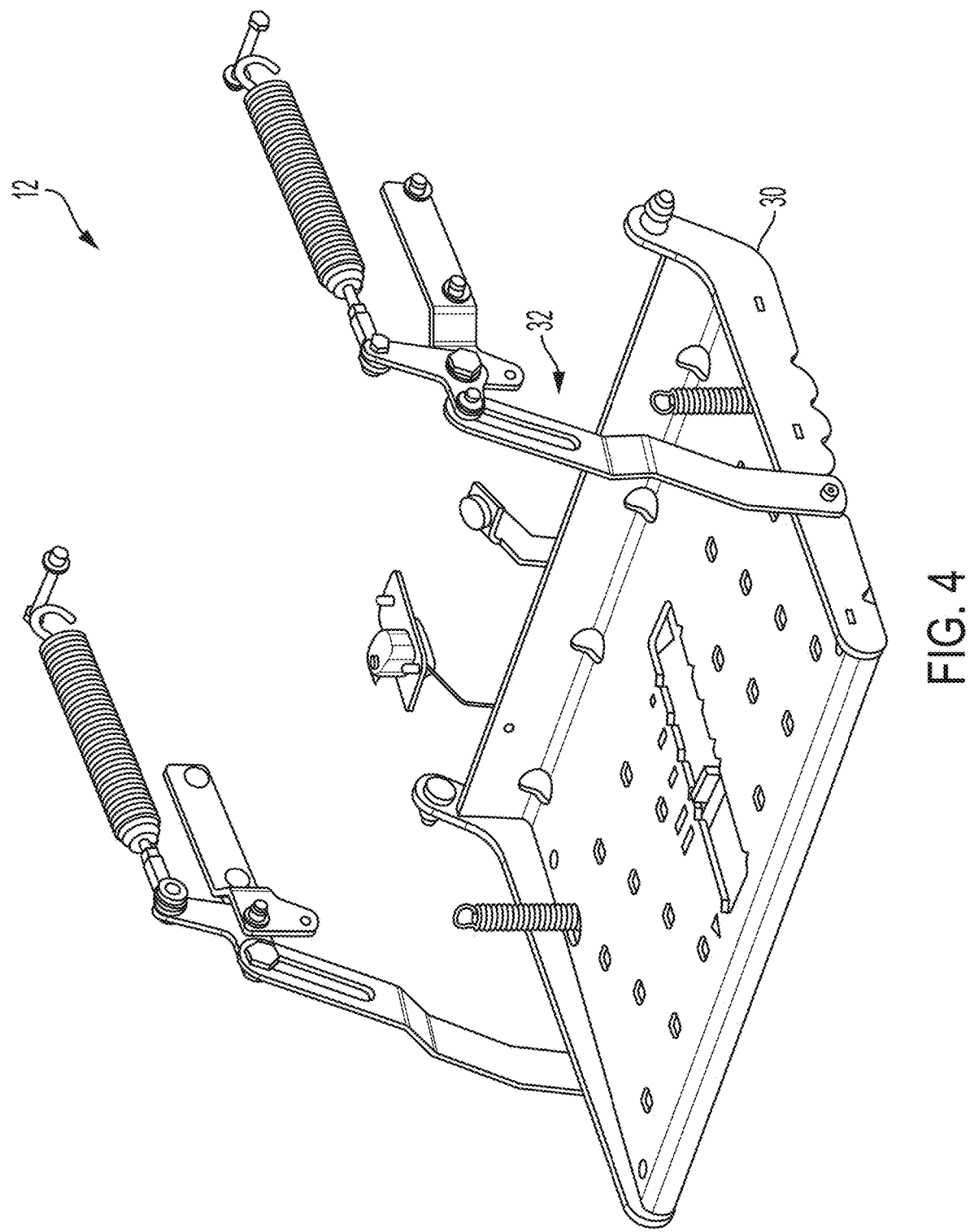
FIG. 4 is another perspective view of the standing platform and suspension assembly shown in FIG. 1, shown from an opposite side as illustrated in FIG. 3.
Figure 5:
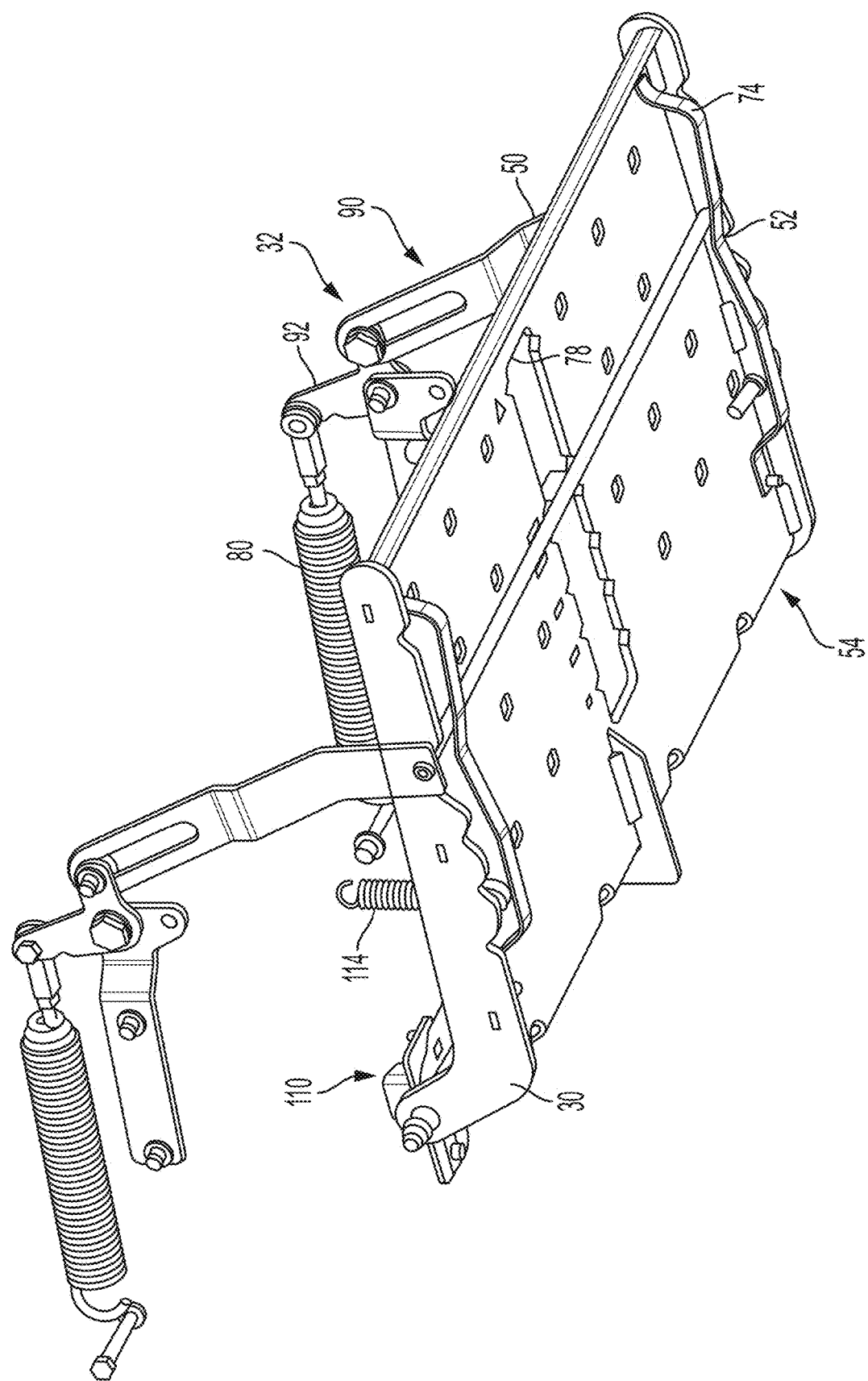
FIG. 5 is a bottom perspective view of the standing platform and suspension assembly shown in FIG. 1.

Referring next to FIGS. 3 to 5, the standing operator support system 12 is shown separate from the standing mower 10.

The suspendable standing platform 30 is shaped and positioned for supporting the load of a standing operator at varied stances. The standing platform 30 is fixable at a platform pivot axis 34, such as through one or more pivot flanges 36. For example, the platform pivot axis 34 may be fixable at the frame 24 of the standing mower 10.

The suspension assembly 32 is adjustably engageable with the standing platform 30 to suspend the standing platform relative to the fixable platform pivot axis 34 of the standing platform 30. Likewise, the suspension assembly 32 includes a fixable suspension pivot axis 36 that is fixable relative to and spaced apart from the fixable platform pivot axis 34, such as also at the frame 24 of the standing mower 10.

A swing arm unit 40 is couplable between the suspension pivot axis 36 and the support platform 30. The swing arm unit 40 engages the standing platform 30 at each engagement location 42 of a plurality of engagement locations 42 of the standing platform 30. The swing arm unit 40 is position-adjustable to engage each engagement location 42 at an attachment end 44 of the swing arm unit 40. An opposite pivot end 46 of the swing arm unit 40 is coupled relative to the suspension pivot axis 36.

In the illustrated embodiment, a swing arm 50 of the swing arm unit 40 is coupled to a support member 52. The support member 52, also referred to as a cross member, extends along an underside 54 of the support platform 30 between opposing swing arms 50 of a pair of opposed swing arm units 40. Thus, the support member 52 is a component of each of the pair of swing arm units 40. In other embodiments, separate but connected support members 52 may be included.

The plurality of engagement locations 42, also referred to as adjustment locations 44, are defined by a set of engageable features of the support platform 30. Generally, one of the standing platform 30 or the suspension assembly 32 includes a plurality of engagement notches 60 spaced apart from one another at the respective engagement locations 42 and arranged in an arc 62. Each notch 60 is configured to receive a support element 64 of the other of the standing platform 30 and the suspension assembly 32.

In the illustrated embodiment, the standing platform 30 includes a plurality of notches 60, such as at the underside 54 of the support platform 30, with the support member 52 of the swing arm units serving as the support element 64 received into the notches 60.

A sliding adjustment mechanism 72 is coupled to the support member 52 for adjusting the suspension assembly 32 relative to the standing platform 30, and more specifically for position-adjusting the swing arm units 40 to the varied engagement locations 42 of the standing platform 30. A biasing retention element 74 of the sliding adjustment mechanism 72 is coupled to the standing platform 30, such as to the underside 54, to retain the cross member 52 against the underside 54 of the standing platform 30 at each of the engagement locations 42. An engagement tab 76 extends through a slot 78 in the standing platform 30. The engagement tab 76 is movable by the operator, removed from the standing platform 30, to cause a single linear sliding motion of the adjustment mechanism 72.

A counter biasing element 80 acts on the swing arm unit 40 for counter-balancing a load of an operator at the standing platform 30. The counter biasing element 80 is fixable at a biasing element pivot axis 82, at a location separate from each of the fixed locations of the platform pivot axis 34 and the suspension pivot axis 36.

The counter biasing element 80 acts in tension on the swing arm unit 40 and is coupled between the suspension pivot axis 36 and the biasing element pivot axis 82. Via this disposition, the counter biasing element 80 is maintained in a substantially horizontal position relative to the ground at each of a plurality of engagement locations 42 of the suspension assembly 32, with or without an operator load applied to the standing platform 30. As used herein, substantially horizontal refers to a range perceived by a user as being horizontal, such as between a range of about −10 degrees to about 10 degrees from the horizontal, or of about −5 degrees to about 5 degrees from the horizontal, or about −2 degrees to about 2 degrees from the horizontal.

The counter biasing element 80 has a constant spring rate regardless of the engagement location 42 of the swing arm unit 40. The illustrated counter biasing element 80 is a coil spring that acts in tension on the respective swing arm unit 40.

As illustrated, a pair of suspension subassemblies 90 are included, each having a separate counter biasing element 80 and swing arm unit 40 coupled to a pivotable pivot bracket 92 disposed between the respective counter biasing element 80 and swing arm unit 40. The pivot bracket 92 is fixable at the suspension pivot axis 36, such as relative to the riding equipment. As shown in FIG. 5, each of a loading force 96 of an operator acting at the engagement location 42 and an opposing counter biasing forcing 98 of the counter biasing element 80 project about and outwardly from the pivot bracket 92 at each engagement location 42. FIG. 5 illustrates positioning of the suspension assembly 32 at two such engagement locations 42 with the operator load 96 illustrated but the standing platform 30 not moved to a substantial horizontal position corresponding to the applied operator load 96.

The sliding of the adjustment mechanism 72 alters a moment arm distance between the engagement location 42 of the swing arm unit 40 with the support platform 30 and the fixable suspension pivot axis 36. The larger moment arm distances, and thus engagement locations 42 spaced farther from the fixable suspension pivot axis 36, are provided for heavy users.

The plurality of engagement locations 42 may include 2 or more locations 42, such as the five locations 42 illustrated.

Referring now to FIGS. 3 to 6, and specifically to one of the suspension subassemblies 90, but applicable to each of the suspension subassemblies 80, the arrangement of the counter biasing element 80, pivot bracket 92 and sing arm unit 40 allows for suspension of the standing platform. The suspension assembly 32 and standing platform 30 are jointly configured to maintain the standing platform 30 suspended above the ground and substantially horizontal to the ground for the varied operators at the varied adjustment locations 42.

In one embodiment, the standing operator support system 12 is configured to maintain substantial horizontal suspension of the standing platform relative to the ground for operators in a weight range of about 50 pounds to about 400 pounds, or of about 60 pounds to about 350 pounds, or of about 120 pounds to about 350 pounds.

Referring now to FIGS. 7 to 11, the suspension assembly is shown adjusted to each of the illustrated five adjustment locations 42.

Turning again to FIG. 6, the standing operator support system 12 includes a curb setting provided to allow for traverse of the standing platform 30, with a an operator at the standing platform, over raised portions of the terrain being traversed. For example, rock ledges or walls or curbs may provide for discrete raised portions of the terrain. The support system 12 is configured to raise a free end 100 of the standing platform 30 and the operator to a raised position vertically upwardly angled from the platform pivot location of the platform pivot axis 36.

Figure 6:
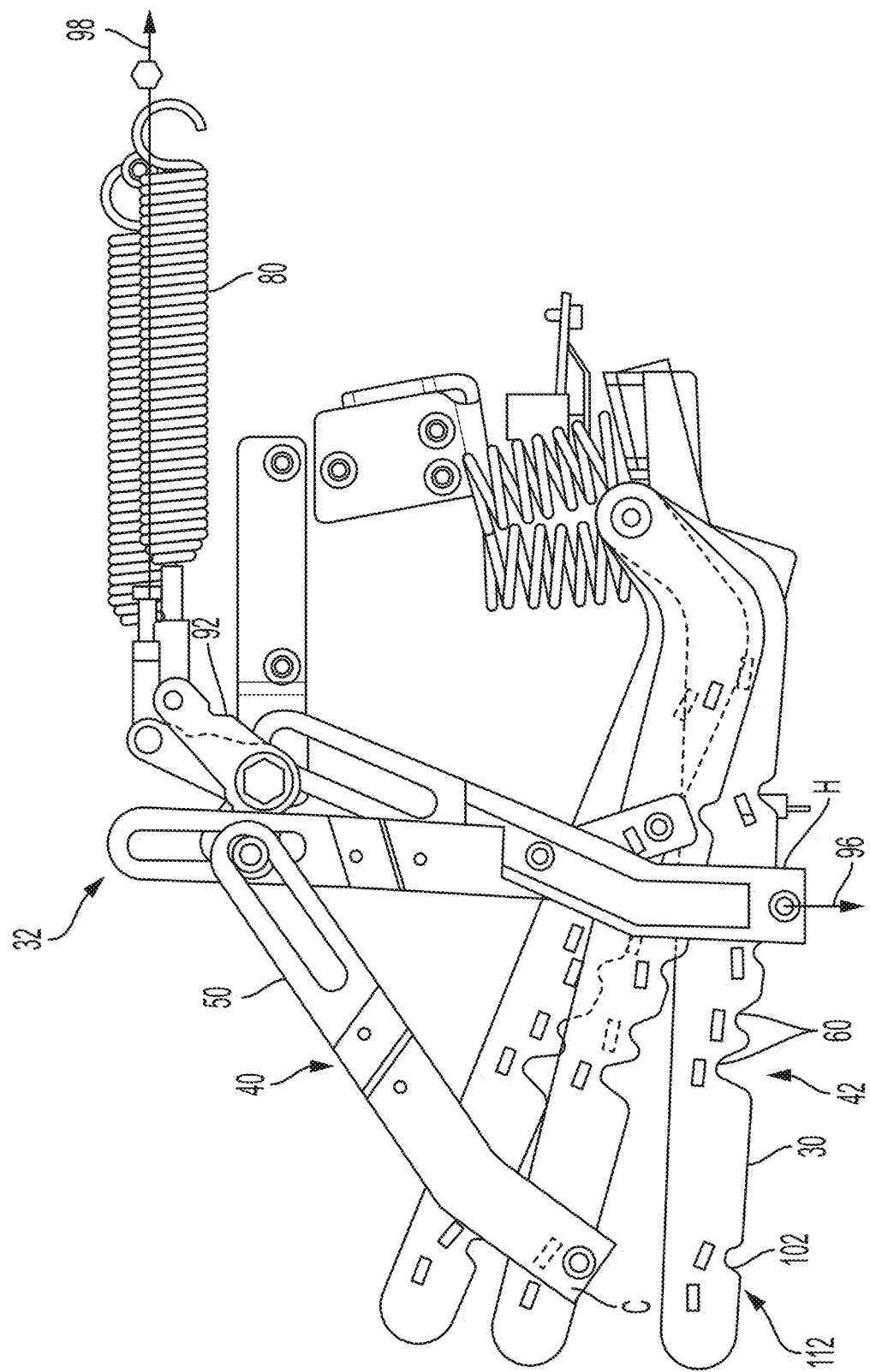
FIG. 6 is a side view showing the standing platform and suspension assembly in various orientations.
Figure 7:
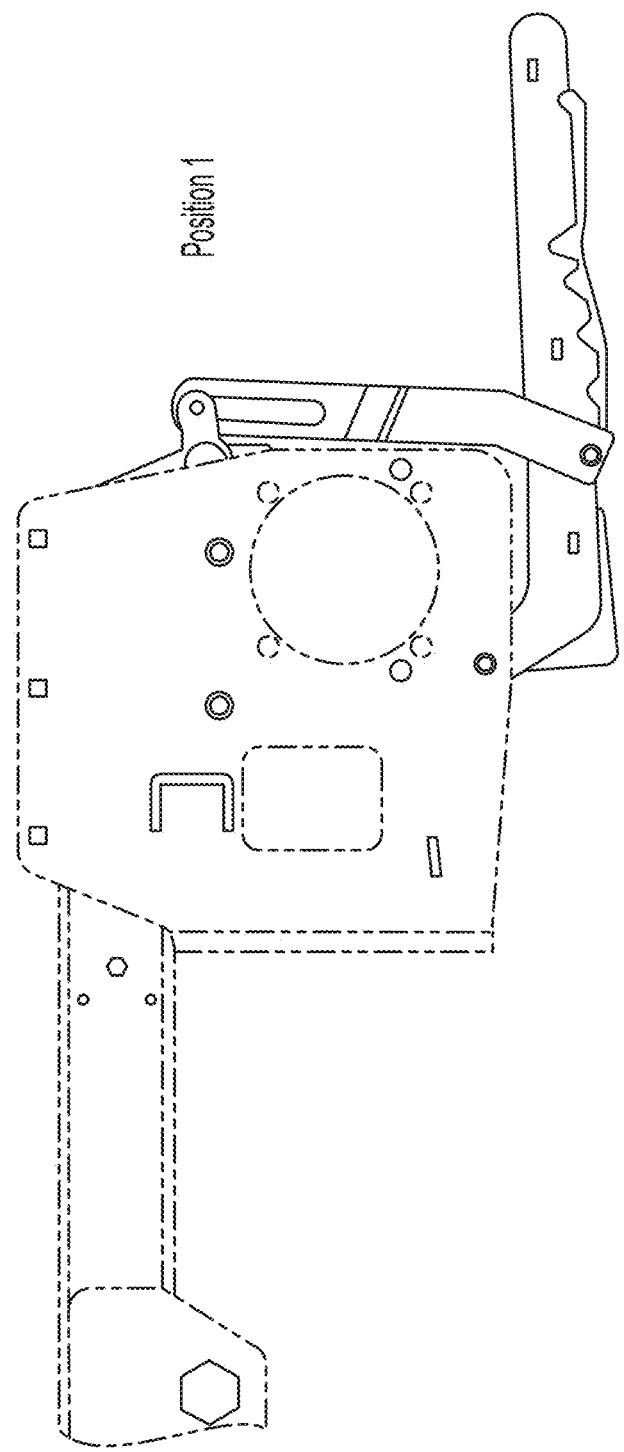
FIG. 7 is a side view showing the standing platform and suspension assembly, with the suspension assembly engaging the standing platform at a first adjustment location.
Figure 8:
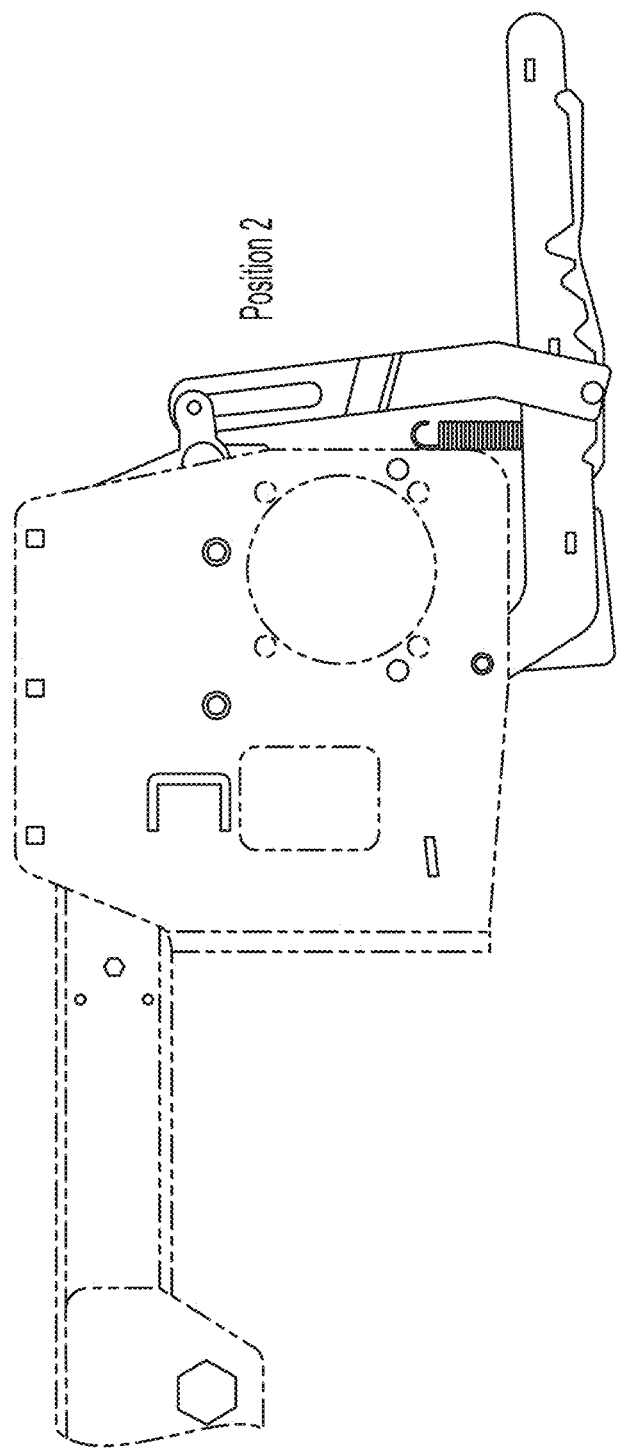
FIG. 8 is a side view showing the standing platform and suspension assembly, with the suspension assembly engaging the standing platform at a second adjustment location.
Figure 9:
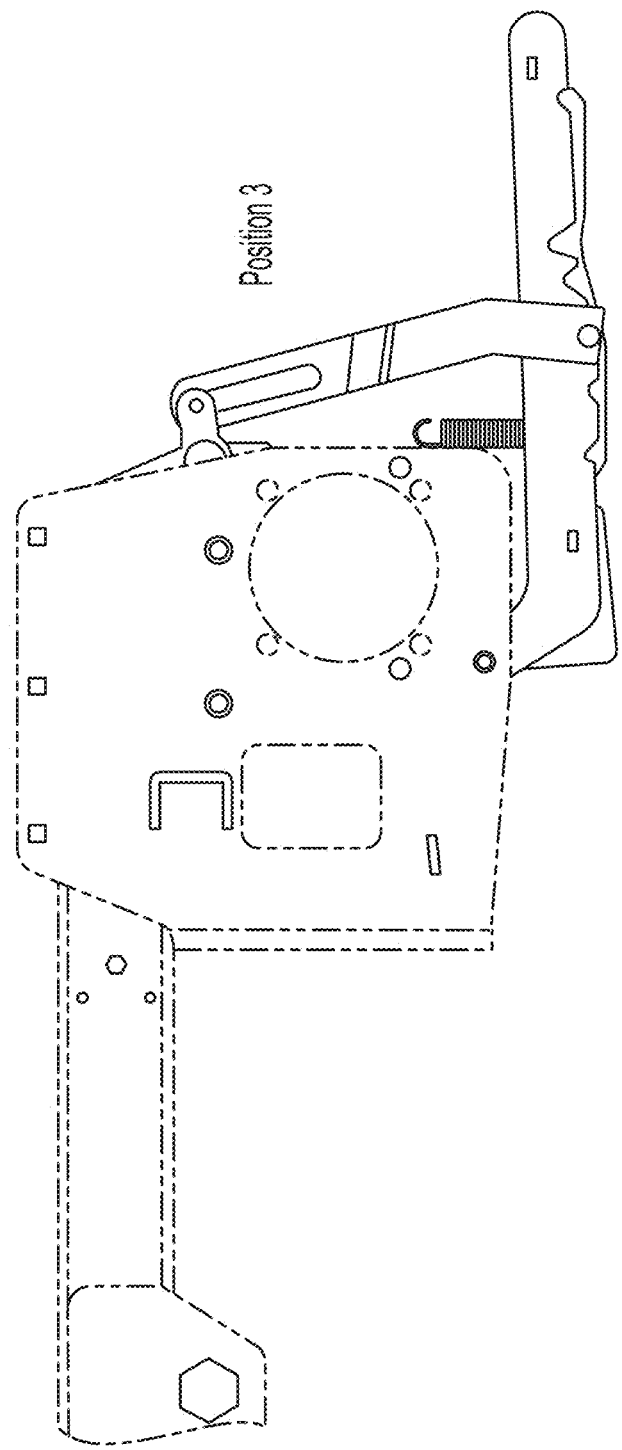
FIG. 9 is a side view showing the standing platform and suspension assembly, with the suspension assembly engaging the standing platform at a third adjustment location.
Figure 10:
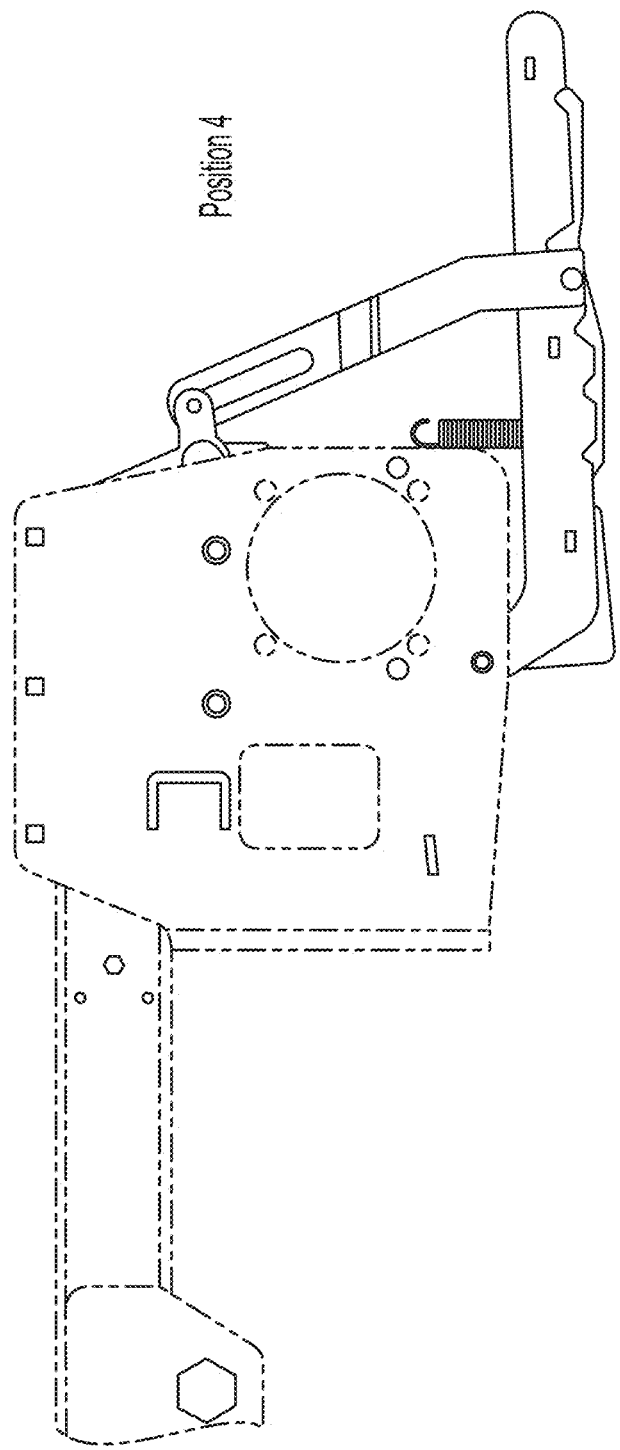
FIG. 10 is a side view showing the standing platform and suspension assembly, with the suspension assembly engaging the standing platform at a fourth adjustment location.
Figure 11:
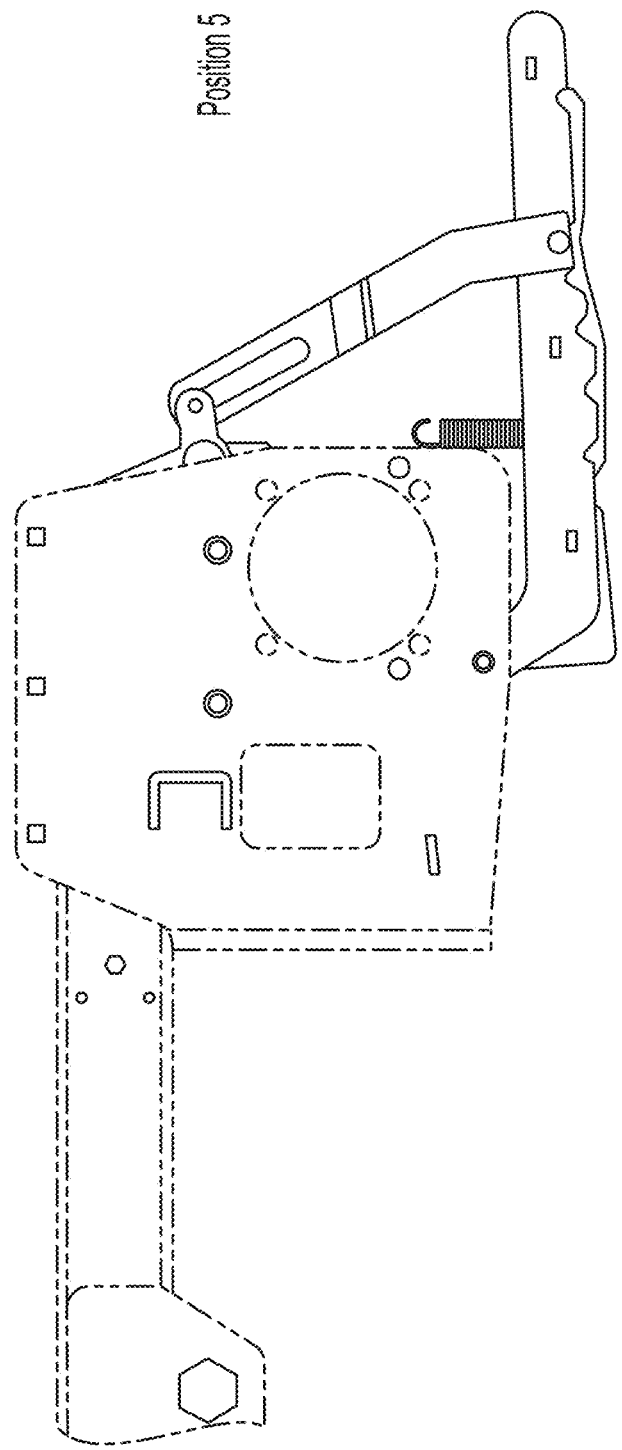
FIG. 11 is a side view showing the standing platform and suspension assembly, with the suspension assembly engaging the standing platform at a fifth adjustment location.

As specifically illustrated at FIG. 6, at the curb setting, the swing arm unit 40 is engaged at a curb notch 102 spaced linearly outwardly from each of the engagement notches 60 towards the free end 100 of the standing platform 30. While the swing arm unit 40 is engaged at the curb notch 102 with the standing platform 30 in the curb position C, the operator and the standing platform 30 are supported by the suspension assembly 32 with the standing platform 40 being angularly raised out of the substantially horizontal position H.

The standing operator support system 12 further includes an operator presence control 110, such as an engageable switch, that is configured for contact with the standing platform 30 when loaded by the weight force of a user at each of the engagement locations 60 and at a curb location 112 of the curb notch 102. A return biasing element 114, such as being fixed at one end separate from the standing platform 30, such as at the frame 24, is operably engaged with the standing platform 30 at each of the engagement locations 42 and at the curb location 112, at least with the operator load 96 of an operator applied to the standing platform 30. The return biasing element 114, such as a coil spring acting in compression, is positioned to pivotably bias the standing platform 30 out of contact with the operator presence control 110 when no operator load 96 is applied to the standing platform 30 at each of the engagement locations 42 and at the curb location 112.

As shown, the swing arm 50 includes a slot 116 allowing for the pivotable raising of the standing platform 30 by the return biasing element 114, while also allowing for retaining the swing arm 50 coupled to the pivot bracket 92 and relative to the fixable suspension pivot axis 36.

Figure 12:
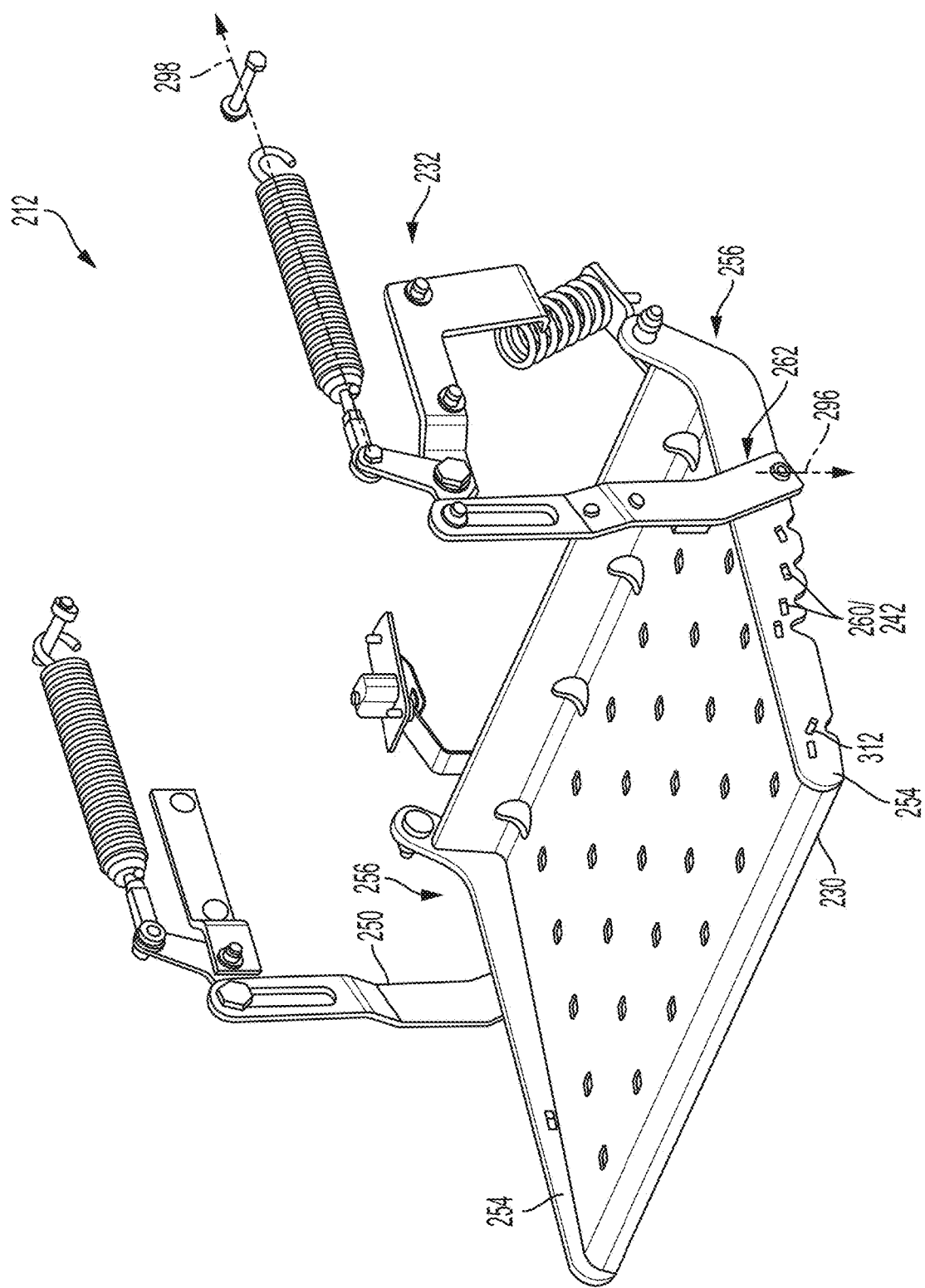
FIG. 12 is perspective view of another standing platform and suspension assembly according to the present disclosure.

Turning next to FIG. 12, an alternative embodiment of the standing operator support system is shown at 212. The standing operator support system 212 is substantially similar to the standing operator support system 12 except as described below.

The standing operator support system 212 includes a standing platform 230 and a suspension assembly 232. The suspension assembly 232 includes swing arms 250 that are configured to engage lateral side walls 254 at lateral sides 256 of the support platform 30. A separate adjustment mechanism, such as attached to the support member 252, is omitted.

Generally, one of the swing arms 250 or the lateral side walls 254 include slots 260 and the other of the swing arms 250 and the lateral side walls 254 include keys 262 configured to be received into the slots 260. As illustrated, at least one swing arm 250 includes at least one key 262 configured to be inserted into a plurality of locking slots 260 of the lateral side walls 254, with a slot 260 being provided adjacent each of the engagement locations 242 and adjacent the curb location 312. Engagement of the key 262 with the slot 260 retains the swing arm unit 240 at the respective engagement location 242 or curb location 312.

In summary, a standing operator support system 12 for riding equipment, such as a standing mower 10, includes a suspendable standing platform 30 for supporting the load of a standing operator and a suspension assembly 32 adjustably engageable with the standing platform 30 to suspend the standing platform relative to a fixable platform pivot axis 34 of the standing platform 30. The suspension assembly 32 is configured to allow for a uniform suspension experience for varied operators of varied weights while maintaining the standing platform 30 in a relatively uniform and substantially horizontal orientation relative to terrain being traversed for the varied operators of varied weights. The suspension assembly is adjustable relative to the standing platform via a single motion to adjust between operator weight settings. The suspension assembly also may be adjustable relative to the standing platform for traverse over discrete raised portions of a terrain, such as a low rock wall or a curb.

Although the invention has been shown and described with respect to a certain embodiment or embodiments, it is obvious that equivalent alterations and modifications will occur to others skilled in the art upon the reading and understanding of this specification and the annexed drawings. While a feature of the invention may have been described above with respect to one or more certain illustrated embodiments, the feature may be combined with one or more other features of the other embodiments, as may be suitable for any given or particular application. Devices, processes, functions and methods that come within the meaning of that which is claimed, either literally or by equivalence, are intended to be embraced therein.

What is claimed is:

1. An operator support system for riding equipment, the operator support system; comprising:
   a standing platform for supporting an operator, the standing platform having a platform pivot axis and a plurality of engagement locations; and
   a suspension assembly adjustably engageable with the standing platform to suspend the standing platform relative to the platform pivot axis, the suspension assembly including:
      a fixable suspension pivot axis that is fixable relative to and spaced apart from the platform pivot axis,
      a swing arm unit coupled to the suspension pivot axis and the support platform, the swing arm unit selectively engaging the standing platform at each of the engagement locations thereof,
      a counter biasing element acting on the swing arm unit for countering a load of the, and
      an adjustment mechanism being linearly slidable for adjusting the engagement location of the swing arm unit to the standing platform.

2. The standing operator support system of claim 1, wherein each of the engagement locations corresponds to a different weight of said operator, and
   wherein the suspension assembly and standing platform are jointly configured to maintain the standing platform suspended substantially horizontal to the ground for the different weights of the operator.

3. The standing operator support system of claim 1, wherein the suspension assembly maintains the standing platform horizontal relative to the ground for the weight of between about 60 pounds and 400 pounds.

4. The standing operator support system of claim 1, wherein sliding of the adjustment mechanism alters a moment arm distance between the engagement location of the swing arm unit with the support platform and the suspension pivot axis.

5. The standing operator support system of claim 1, wherein the adjustment mechanism includes an engagement tab extendable through a slot in the standing platform to secure the adjustment mechanism to the standing platform, the engagement tab being movable into and out of the slot to allow the adjustment mechanism to slide relative to the standing platform.

6. The standing operator system of claim 1, wherein one of the standing platform or the suspension assembly includes a plurality of engagement notches spaced apart from one another at the respective engagement locations, the engagement notches being arranged in an arc, each engagement notch being configured to receive a support element of the other of the standing platform or the suspension assembly.

7. The standing operator system of claim 1, wherein the suspension assembly includes a cross member supporting the standing platform at an underside of the standing platform and coupled to the adjustment mechanism, and wherein a biasing retention element coupled to the standing platform retains the cross member against the underside of the standing platform at each of the engagement locations.

8. The standing operator support system of claim 1, further including a curb position spaced from the plurality of engagement locations, wherein engagement of the swing arm at the curb position allows for a raised riding position of the standing platform such that a free end of the standing platform is oriented vertically.

9. The standing operator support system of claim 1, further including an operator presence control configured for contact with the standing platform when loaded by the weight of the operator, and further including a return spring operably engaged with the standing platform to bias the standing platform out of contact with the operator presence control when no operator load is applied to the standing platform at each of the engagement locations.

10. The standing operator system of claim 1, in combination with the riding equipment with each of the suspension pivot axis and the platform pivot axis being fixable at a frame of the riding equipment.

11. A standing operator support system for riding equipment, the standing operator support system, comprising:
   a suspendable standing platform for supporting the load of a standing operator; and
   a suspension assembly adjustably engageable with the standing platform to suspend the standing platform relative to a fixable platform pivot axis of the standing platform, the suspension assembly including
      a swing arm unit position-adjustable to engage each engagement location of a plurality of engagement locations of the standing platform,
      a counter biasing element for countering a load of an operator at the standing platform, and
      a pivotable pivot bracket disposed between and coupled to each of the swing arm unit and the counter biasing element, the pivot bracket fixable at a suspension pivot axis relative to the riding equipment, and the suspension pivot axis being fixable relative to and spaced apart from the fixable platform pivot axis,
   wherein each of a loading force of an operator acting at the engagement location and an opposing counter biasing forcing of the counter biasing element project about and outwardly from the pivot bracket at each engagement location.

12. The standing operator support system of claim 11, wherein position-adjustment of the swing arm between engagement locations adjusts a moment arm distance between the engagement location of the swing arm unit with the support platform and the fixable suspension axis.

13. The standing operator support system of claim 11, further including a curb position spaced from the plurality of engagement locations, wherein engagement of the swing arm at the curb position allows for a raised riding position such that a free end of the standing platform is vertically upwardly angled from the platform pivot location while supported by the suspension assembly.

14. The standing operator support system of claim 11, in combination with the riding equipment with each of the suspension pivot axis and the platform pivot axis being fixable at a frame of the riding equipment.

15. A standing operator support system for riding equipment, the standing operator support system, comprising:
   a suspendable standing platform for supporting the load of a standing operator, the standing platform fixable at a platform pivot axis; and
   a suspension assembly adjustably engageable with the standing platform to suspend the standing platform relative to the fixable platform pivot axis of the standing platform, the suspension assembly including
      a swing arm unit position-adjustable to engage each engagement location of a plurality of engagement locations of the standing platform,
      a counter biasing element acting in tension on the swing arm unit and fixable at a biasing element pivot axis relative to and spaced from the platform pivot axis, the counter biasing element maintained in a substantially horizontal position relative to the ground at each of a plurality of engagement locations, with or without an operator load applied to the standing platform.

16. The standing operator support system of claim 15, wherein the counter biasing element has a constant spring rate regardless of the engagement location of the swing arm unit.

17. The standing operator support system of claim 15, wherein the counter biasing element is a coil spring.

18. The standing operator support system of claim 15, wherein the swing arm unit is position-adjustable relative to the standing platform by an adjustment mechanism coupled to the swing arm unit and in sliding engagement with the standing platform, and wherein the sliding adjustment mechanism requires only a single, linear sliding motion for adjusting the engagement location of the swing arm unit at the standing platform.

19. The standing operator support system of claim 15, in combination with the riding equipment with each of the biasing element pivot axis and the platform pivot axis being fixable at a frame of the riding equipment.

* * * * *